United States Patent
Bauer (10) Patent No.: US 10,466,093 B2
(45) Date of Patent: Nov. 5, 2019

(54) FAILSAFE ELECTROMECHANICAL WEIGHT ON WHEELS DETECTION

(71) Applicant: Sikorsky Aircraft Corporation, Stratford, CT (US)

(72) Inventor: Bradley M. Bauer, Cromwell, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 174 days.

(21) Appl. No.: 15/648,078

(22) Filed: Jul. 12, 2017

(65) Prior Publication Data

US 2019/0017862 A1 Jan. 17, 2019

(51) Int. Cl.
| | |
|---|---|
| *G01G 19/07* | (2006.01) |
| *G01G 19/12* | (2006.01) |
| *B64C 25/00* | (2006.01) |
| *B64C 25/34* | (2006.01) |
| *B64D 45/00* | (2006.01) |

(52) U.S. Cl.
CPC ........... *G01G 19/12* (2013.01); *B64C 25/001* (2013.01); *B64D 45/00* (2013.01); *B64D 45/0005* (2013.01); *G01G 19/07* (2013.01); *B64C 25/34* (2013.01)

(58) Field of Classification Search
CPC ...... G01G 19/07; G01G 19/12; B64C 25/001; B64C 25/34; B64D 45/00; B64D 45/0005
See application file for complete search history.

(56) References Cited

U.S. PATENT DOCUMENTS

| | | | | | |
|---|---|---|---|---|---|
| 2,587,628 | A | * | 3/1952 | King | G01G 19/07 73/11.04 |
| 3,109,505 | A | * | 11/1963 | Davis | G01G 19/12 177/137 |
| 3,167,142 | A | * | 1/1965 | Meneely | B60G 17/06 177/137 |
| 3,480,095 | A | * | 11/1969 | Tuchman | G01G 19/08 177/137 |
| 3,488,997 | A | * | 1/1970 | Kliever | G01G 19/07 177/136 |
| 3,499,500 | A | * | 3/1970 | Harding | G01G 3/1406 177/136 |
| 3,517,550 | A | * | 6/1970 | Leventhal | G01G 19/07 73/764 |
| 3,581,836 | A | * | 6/1971 | Segerdahl | G01G 19/07 177/1 |
| 3,955,636 | A | * | 5/1976 | Askew | B60G 17/019 177/137 |

(Continued)

FOREIGN PATENT DOCUMENTS

EP 3100950 A1 12/2016

OTHER PUBLICATIONS

Extended European Search Report; European Application No. 18182715.5; dated Nov. 29, 2018; 9 Pages.

*Primary Examiner* — Randy W Gibson
(74) *Attorney, Agent, or Firm* — Cantor Colburn LLP (57) ABSTRACT

A weight-on-wheel sensing system includes a movable linkage assembly. An indicator is associated with the linkage assembly. At least one biasing mechanism is operably coupled to the indicator such that a biasing force of the biasing mechanism is applied to the indicator. A position sensing mechanism coupled to the indicator to determine a position of the indicator.

19 Claims, 8 Drawing Sheets

(56) References Cited

U.S. PATENT DOCUMENTS

| | | | | |
|---|---|---|---|---|
| 4,312,042 A * | 1/1982 | Bateman | ............... | G01G 19/07 |
| | | | | 177/136 |
| 4,756,374 A * | 7/1988 | Bailey | ..................... | G01G 7/06 |
| | | | | 177/128 |
| 6,575,405 B2 | 6/2003 | Bryant et al. | | |
| 7,609,056 B2 | 10/2009 | Junk et al. | | |
| 2008/0099602 A1 | 5/2008 | Zyss et al. | | |
| 2017/0322069 A1* | 11/2017 | Mastrianni | ............ | G01G 19/07 |
| 2018/0372535 A1* | 12/2018 | Bailly | ................... | G01G 19/07 |

* cited by examiner

FAILSAFE ELECTROMECHANICAL WEIGHT ON WHEELS DETECTION

BACKGROUND

The present disclosure relates to a rotary wing aircraft, and more particularly, to a failsafe mechanism for automatically detecting weight-on-wheels on a landing gear of a rotary wing aircraft.

Conventional aircraft may use weight-on-wheel (WOW) sensors and switches to detect a position of a component in a landing gear system that moves when the aircraft lands, such as a shock strut or drag beam, and thus sense a landing in response to such movement. Measurement of WOW for fly-by-wire and autonomous rotorcraft can be critical to a correct transition of the rotorcraft control system from airborne state to a ground state. Current systems with mechanical switches and sensors do not always actuate at the same amount of force on the landing gear. Further, current systems provide binary analog outputs and lack an integrated self-test capability.

SUMMARY

According to an embodiment, a weight-on-wheel sensing system includes a movable linkage assembly. An indicator is associated with the linkage assembly. At least one biasing mechanism is operably coupled to the indicator such that a biasing force of the biasing mechanism is applied to the indicator. A position sensing mechanism coupled to the indicator to determine a position of the indicator.

In addition to one or more of the features described above, or as an alternative, in further embodiments during normal operation, movement of the linkage assembly causes the indicator to translate about an axis within a normal range of motion.

In addition to one or more of the features described above, or as an alternative, in further embodiments during normal operation, the linkage assembly overcomes the biasing force of the at least one biasing mechanism.

In addition to one or more of the features described above, or as an alternative, in further embodiments during a failure of the weight-on-wheel sensing system, the biasing force of the at least one biasing mechanism causes the indicator to transition to a failure position.

In addition to one or more of the features described above, or as an alternative, in further embodiments the position sensing mechanism is operably coupled to a control system to communicate a position of the indicator to the control system.

In addition to one or more of the features described above, or as an alternative, in further embodiments the control system is configured to determine an operational status of the weight-on-wheel sensing system in response to the position of the indicator.

In addition to one or more of the features described above, or as an alternative, in further embodiments the linkage assembly is connected to a landing assembly of an aircraft.

In addition to one or more of the features described above, or as an alternative, in further embodiments the linkage assembly includes a push rod.

In addition to one or more of the features described above, or as an alternative, in further embodiments the indicator is a free end of the push rod and the position sensing mechanism is one of a linear variable differential transformer, potentiometer, and position sensor, coupled to the free end of the push rod.

In addition to one or more of the features described above, or as an alternative, in further embodiments the weight-on-wheel sensing system includes a bracket, wherein the indicator includes a lever mounted to the bracket via a shaft, the lever being rotatable about an axis of rotation.

In addition to one or more of the features described above, or as an alternative, in further embodiments the at least one biasing mechanism is connected to a first end of the lever.

In addition to one or more of the features described above, or as an alternative, in further embodiments the linkage assembly is connected to a second end of the lever, wherein the linkage assembly is configured to translate along an axis.

According to another embodiment, an aircraft includes an airframe, a landing gear operably coupled to the airframe and a weight-on-wheels sensing system associated with the landing gear. The weight-on-wheels sensing system includes an indicator movable in response to a position of the at least one landing gear and a position sensing mechanism coupled to the indicator. If the weight-on-wheels sensing system fails, the indicator is automatically biased to a failure position.

In addition to one or more of the features described above, or as an alternative, in further embodiments during normal operation of the weight-on-wheel sensing system, the indicator is movable relative to an axis within a normal range of motion.

In addition to one or more of the features described above, or as an alternative, in further embodiments comprising a flight control system, the position sensing mechanism being arranged in communication with the flight control system to communicate a position of at least one of the indicator and the landing gear.

In addition to one or more of the features described above, or as an alternative, in further embodiments the position sensing mechanism is operably coupled to a control system to communicate a position of the indicator to the control system.

In addition to one or more of the features described above, or as an alternative, in further embodiments comprising at least one biasing mechanism operably coupled to the indicator and a linkage assembly associated with the indicator.

In addition to one or more of the features described above, or as an alternative, in further embodiments during normal operation of the weight-on-wheel sensing system, movement of the at least one landing gear overcomes a biasing force of the at least one biasing mechanism acting on the indicator.

In addition to one or more of the features described above, or as an alternative, in further embodiments the weight-on-wheels sensing system is mounted to at least one of the airframe and the landing gear.

In addition to one or more of the features described above, or as an alternative, in further embodiments the weight-on-wheels sensing system is mounted within a stub wing of the aircraft.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
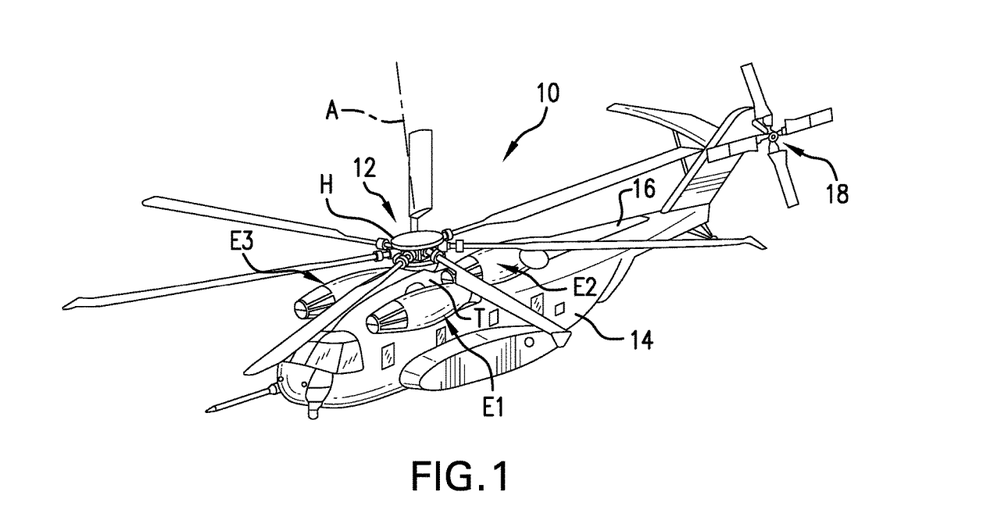
FIG. 1 is a schematic diagram of an example of a rotary wing aircraft.
Figure 2:
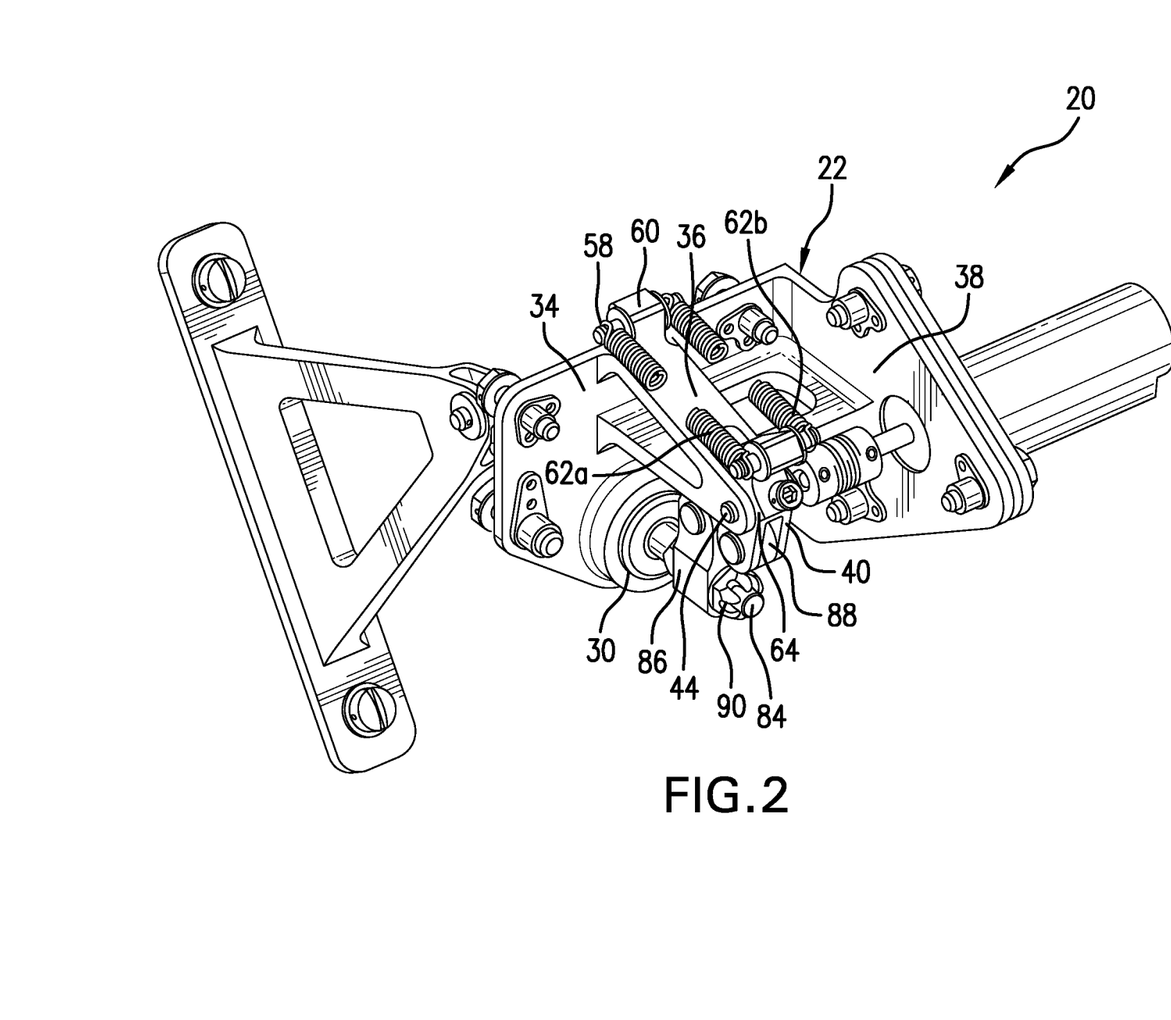
FIG. 2 is an isometric view of a weight-on-wheels sensing system according to an embodiment.
Figure 3:
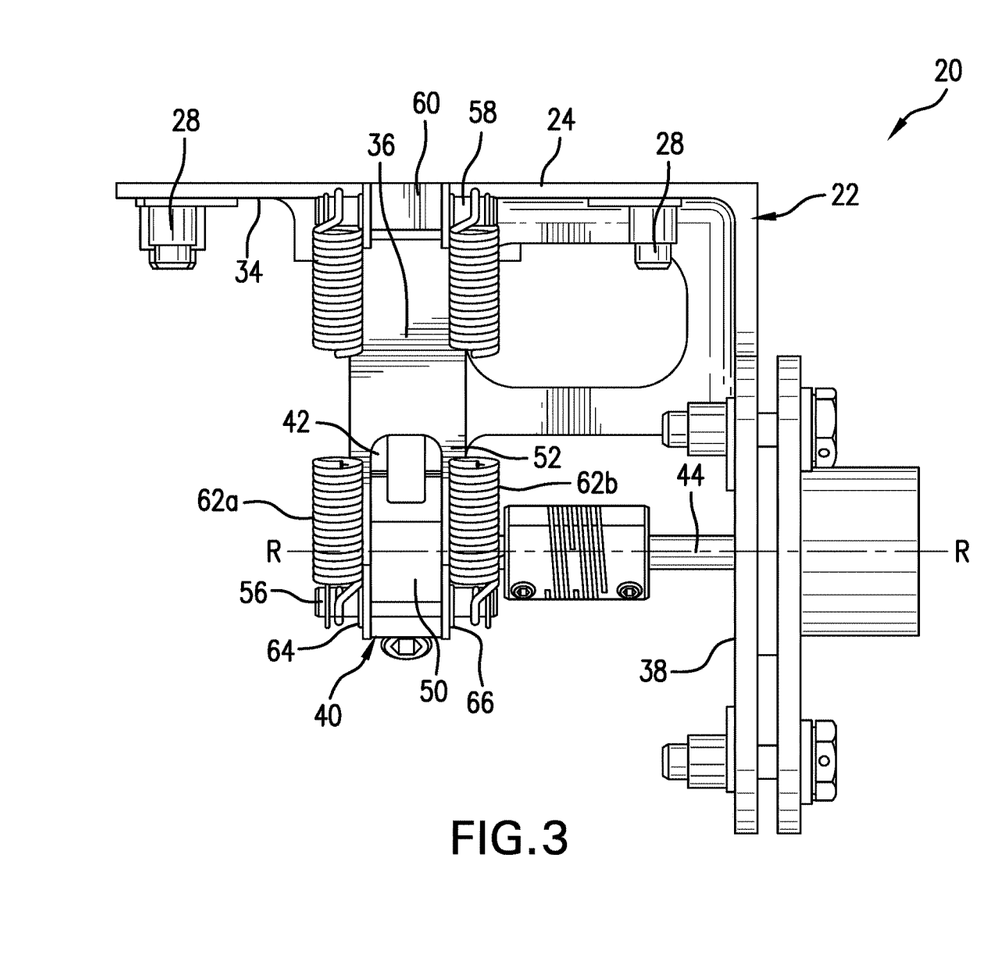
FIG. 3 is a top view of weight-on-wheels sensing system according to an embodiment.
Figure 4:
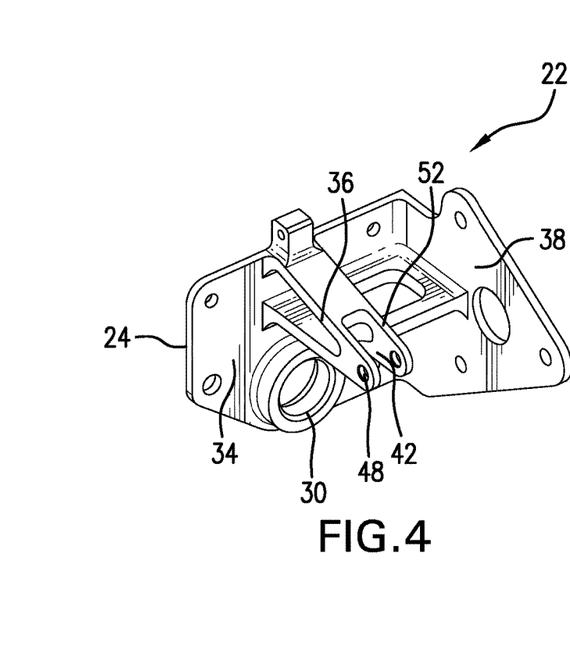
FIG. 4 is an isometric view of a mounting bracket of a weight-on-wheels sensing system according to an embodiment.
Figure 5:
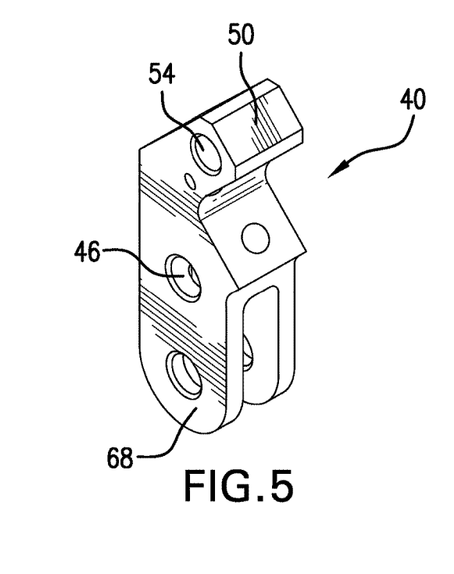
FIG. 5 is an isometric view of a lever of a weight-on-wheels sensing system according to an embodiment.
Figure 6:
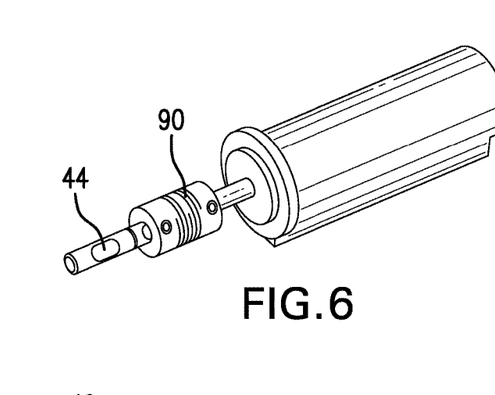
FIG. 6 is an isometric view of a rotary variable differential transformer of a weight-on-wheels sensing system according to an embodiment.
Figure 7:
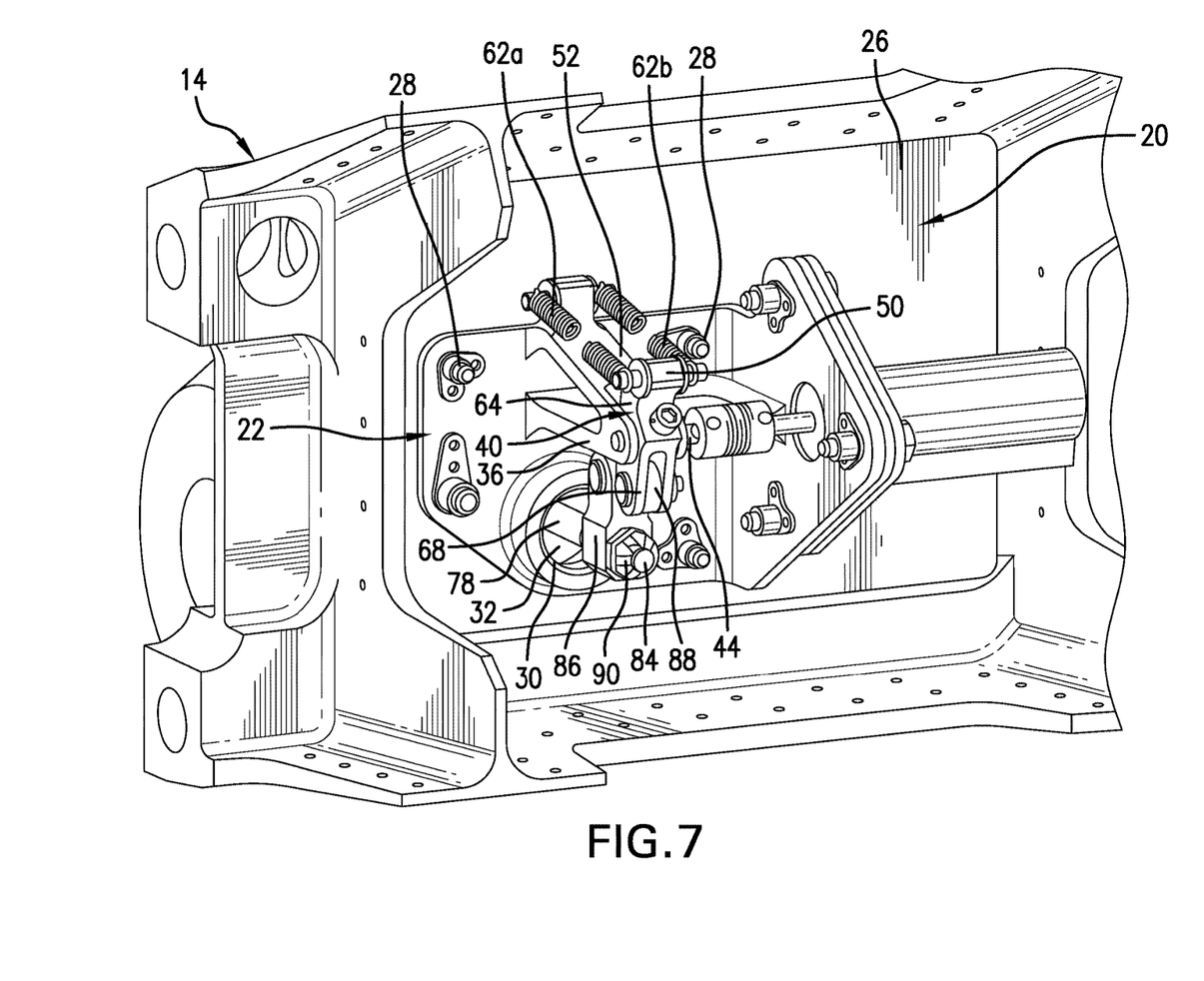
FIG. 7 is an isometric view of a weight-on-wheels sensing system mounted to an airframe according to an embodiment.
Figure 8:
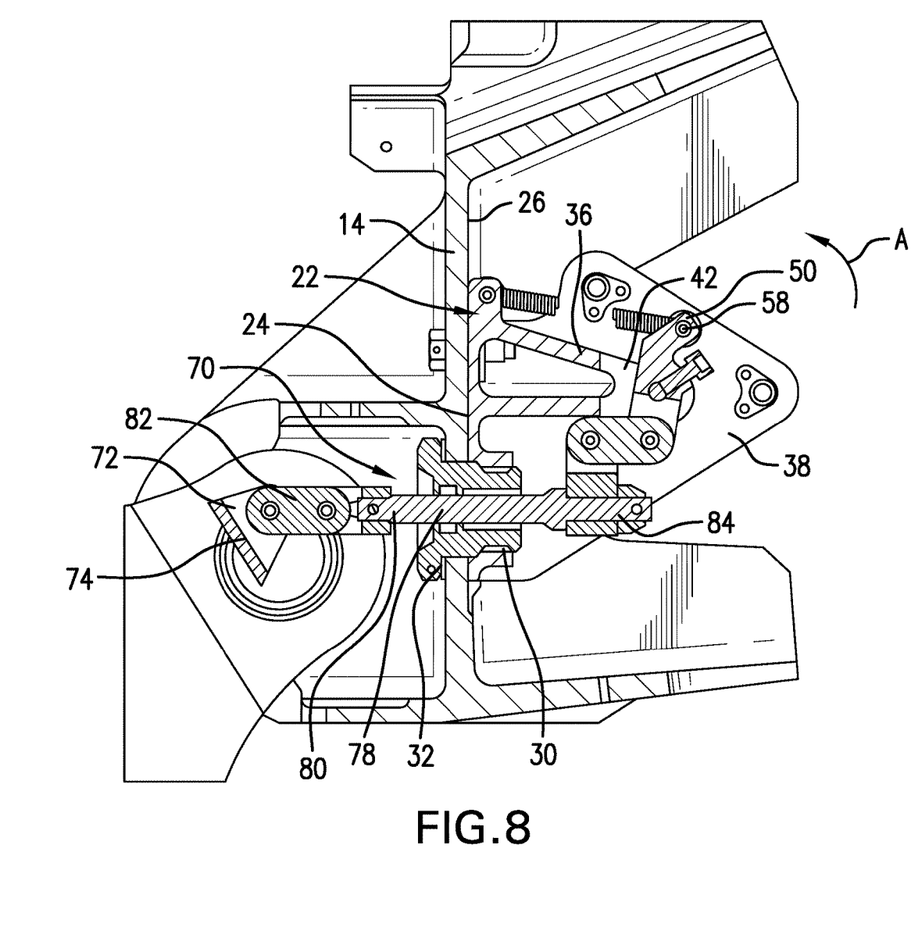
FIG. 8 is a cross-sectional view of a weight-on-wheels sensing system mounted to an airframe during normal operation according to an embodiment.
Figure 9:
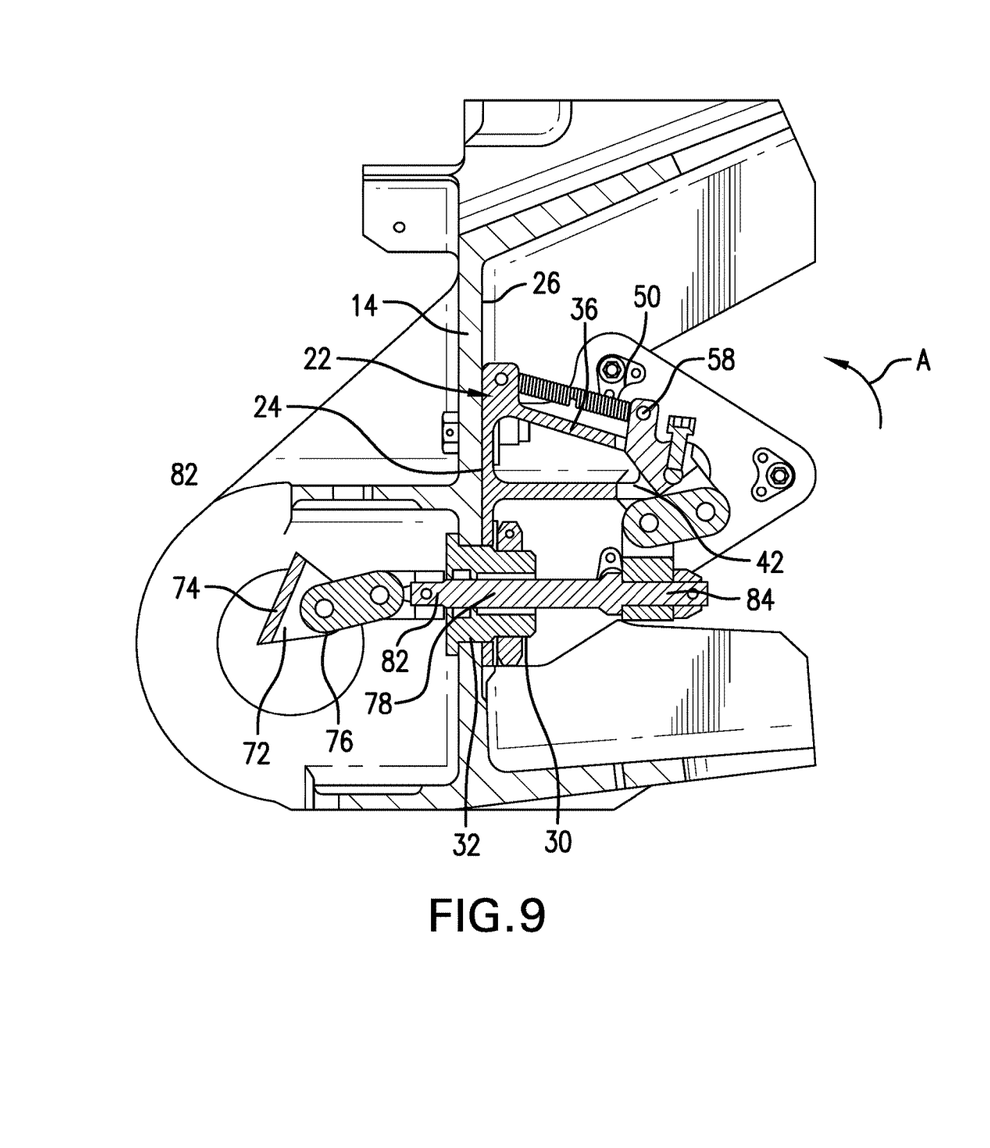
FIG. 9 is a cross-sectional view of a weight-on-wheels sensing system mounted to an airframe during a failure according to an embodiment.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E to a power transmission gearbox, to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will also benefit from the present invention.

With reference now to FIGS. 2-9, a weight on wheels (WOW) sensing system 20 is provided for use with the aircraft 10, and more particularly, for use with a landing gear of the aircraft 10. Although a single WOW sensing system 20 is illustrated, it should be understood that an aircraft 10 may include a plurality of WOW sensing systems 20, each being associated with a corresponding landing gear. The WOW sensing system 20 includes a mounting bracket 22 positionable in contact with the airframe 14. In an embodiment, the WOW sensing system 20 is adapted for placement at the same location as conventional WOW systems, such as within the stub wings of the aircraft 10 for example. As shown, a first surface 24 of the bracket 22 is arranged in direct contact with a corresponding surface 26 of the airframe 14. Accordingly the first surface 24 of the bracket 22 and the surface 26 of the airframe 14 have generally complementary contours. In the illustrated, non-limiting embodiment, the surfaces 24, 26 of the bracket 22 and airframe 14 are generally planar. However, other contours are also contemplated herein.

When the bracket 22 is mounted to the airframe 14, such as via a plurality of fasteners 28 for example, an opening 30 formed in the bracket 22 is substantially aligned with an opening 32 (see FIGS. 8 and 9) formed in the airframe 14. Protruding from a second surface 34 of the bracket 22, opposite the first surface 24 of the bracket 22, is a support 36. In an embodiment, the support 36 is vertically aligned with the opening 30. The support 36 may be connected to the second surface 34 of the bracket 22, or may be integrally formed therewith. As shown, the support 36 is generally triangular in shape; however, a support 36 having any shape is within the scope of the disclosure. In addition, the support 36 may be solid, or alternatively, may have a generally hollow interior to reduce the overall weight of the bracket 22. In an embodiment, the bracket 22 has a generally angled configuration. In such embodiments, the support 36 may be connected to both the second surface 34 and an adjacent surface 38 defined by the angle to increase the structural rigidity thereof. Although the bracket 22 is illustrated as having a right angle, other suitable angles are also within the scope.

A lever or indicator 40 is pivotally coupled to the support extending from the bracket 22. In the illustrated, non-limiting embodiment, the support 36 defines a hollow cavity 42 within which the lever 40 is received. However, in other embodiments, the lever 40 may be positioned adjacent either side of the support 36. A first shaft 44 extends through a centrally located through hole 46 formed in the lever 40 and an adjacent opening 48 formed in the support 36 to couple the lever 40 to the support 36 to define an axis of rotation R of the lever 40.

A first end 50 of the lever 40 extends generally beyond an upper surface 52 of the support 36. The first end 50 of the lever 40 additionally includes a through hole 54 for receiving a second shaft 56 therein. In an embodiment, a horizontally oriented pin 58 is arranged at an upper surface 60 of the bracket 22, generally adjacent the second surface 34. The second shaft 56 may be coupled to the pin 58 via at least one biasing mechanism 62. Alternatively, the second shaft 56 may be coupled to the airframe 14 via at least one biasing mechanism 62. In the illustrated, non-limiting embodiment, a first biasing mechanism 62a is coupled to a first portion of the pin 58 and a portion of the second shaft 56 adjacent a first side 64 of the lever 40 and a second biasing mechanism 62b is coupled to a second portion of the pin 58 and a portion of the second shaft 56 adjacent a second, opposite side 66 of the lever 40. The biasing force of the at least one biasing mechanism 62 is configured to bias the lever 40 about the rotational axis R defined by the first shaft in the direction indicated by arrow A (see FIG. 8).

A linkage assembly 70 (best shown in FIGS. 8 and 9) associated with the landing gear of the aircraft 10 is operably coupled to the lever 40. In the illustrated, non-limiting embodiment, the linkage assembly 70 includes a drag beam lever arm 72 having a first end 74 configured to connect to the drag beam of the landing gear and a second end 76 coupled to a push rod 78. A first end 80 of the push rod 78 may be directly connected to the second end 76, or alternatively, an intermediate link 82 may couple the end 80 of the push rod 78 and the drag beam lever arm 72. As shown, the push rod 78 extends through the aligned openings 30, 32 formed in the airframe 14 and bracket 22, such that a second end 84 of the push rod 78 is located near the support 36 and lever 40.

The second end 84 of the push rod 78 is connected to a second end 68 of the lever 40, either directly, or via one or more links. In the illustrated, non-limiting embodiment, the second end 84 of the push rod is offset from the second end of the lever 40, such that a first connector 86 and a second connector 88 extend there between. The first connector 86 may include a through hole within which the second end 84 of the push rod 78 is received and a nut 90 may be used to restrict movement of the first connector 86 from the second end 84. As shown, the first connector 86 is oriented generally perpendicular to the axis defined by the push rod 78, and the second connector 88 is oriented generally parallel to the axis defined by the push rod 78. However, other configurations of a linkage assembly 70 are also contemplated herein.

The connection between the linkage assembly 70 and the second end of the lever 40 drives rotation of the lever 40 about the axis of rotation R, in response to a position of the landing gear. As the landing gear transitions between various configurations, such as a fully extended strut, a partially extended strut, and a fully compressed strut, the drag beam moves causing the push rod 78 connected thereto to translate relative to the airframe 14 and bracket 22. This translation applies a force to the second end 68 of the lever 40, causing the lever 40 to rotate about the axis R. Accordingly, the position of the lever 40 relative to the axis indicates a current state of the landing gear.

In an embodiment, positioning sensing mechanism 90, such as a rotary variable differential transformer (VDT), position sensor, or potentiometer for example, is mounted to the first shaft 44 at a position between the lever 40 and the surface 38 of the bracket 22. However, it should be understood that in other embodiments, the system 20 described herein may be adapted for use with a linear positioning sensing mechanism 90. In an embodiment, the first shaft 44 is operably coupled to the second surface 34 to support the VDT in an optimum position. The rotary VDT 90 is operable to sense rotation of the first shaft 44, and therefore the lever 40 about axis R, to determine a status of the landing gear. The rotary VDT 90 may communicate with a flight control system of the aircraft to communicate the status of a corresponding landing gear.

During normal operation of the WOW sensor system 20, the connection between the linkage assembly 70 and the second end 68 of the lever 40 opposes the biasing force of the biasing mechanism 62 acting on the first end 50 of the lever 40. In the event of a failure of the linkage assembly 70, such as a breakage thereof for example, the push rod 78 will not apply a force to the lever 40. As a result, the biasing force of the biasing mechanism 62 causes the lever to rotate in the direction indicated by arrow A, to a position beyond a normal operating range associated with movement of the drag beam. In an embodiment, in the event of a failure of the linkage assembly 70, the lever 40 will rotate as far about the axis R in the direction of arrow A as possible.

Figure 10:
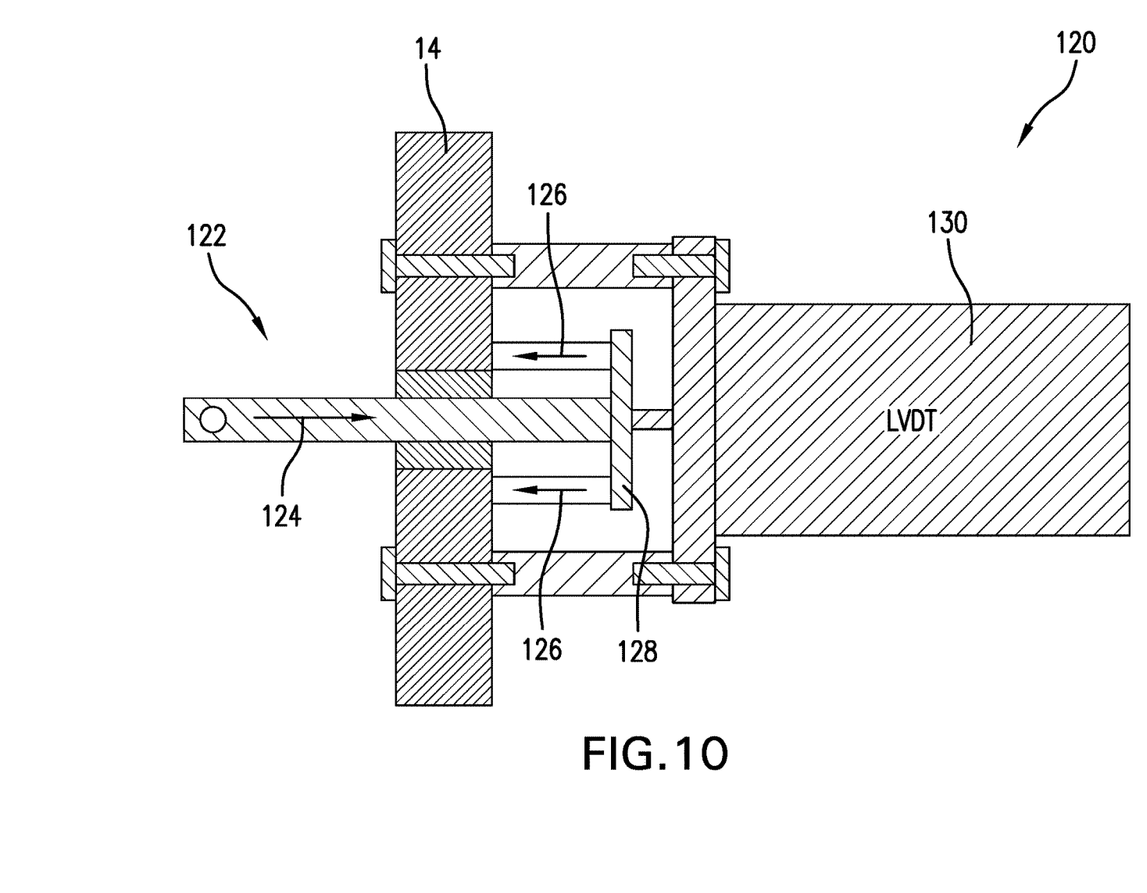
FIG. 10 is a schematic diagram of a weight-on-wheels sensing system according to another embodiment.

In another embodiment shown in FIG. 10, an alternative WOW sensing system 120 includes a linkage assembly 122 similar to the linkage assembly 70 of the previous embodiments. As previously described, the linkage assembly 122 may include a drag beam lever arm (not shown) having a first end connected to the drag beam of the landing gear and a second end coupled to a push rod 124. One or more biasing mechanisms 126 extend from a surface of the airframe 14, or alternatively, from a mounting bracket such as bracket 22 for example, and connect to a free end 128 of the push rod 124. The free end 128 of the push rod 124 may include a flange or have a diameter greater than the remainder of the push rod 124 to provide an area for attaching the at least one biasing mechanism 126. In an embodiment, a position sensing mechanism 130, such as a linear VDT for example, is mounted to the airframe 14 and/or mounting bracket at a position offset from the pushrod 128. The VDT is operable to sense translation of the pushrod 124 along an axis to determine a status of the landing gear and may communicate the status of a corresponding landing gear to a flight control system of the aircraft.

During normal operation of the WOW sensor system 120, the force applied to the linkage assembly 122 in response to the landing gear opposes the biasing force of the at least one biasing mechanism 126 acting on the free end 128 of the push rod 124. In the event of a failure of the linkage assembly 70, such as a breakage thereof for example, the biasing force of the biasing mechanism 126 will cause the push rod 128 to translate about an axis to a position beyond a normal operating range associated with movement of the drag beam.

Because the VDT 90, 130 is monitoring the position of a corresponding component, i.e. the first shaft 44 and lever 40 or the push rod 124, the VDT will detect movement of the component to a position indicative of a failure. The flight control system will process that the component is in the "failure position" and will determine that the WOW sensing system 20, 120 is not functioning properly and ignore any further output from the sensor system 20, 120.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A weight-on-wheel sensing system for a landing assembly of an aircraft comprising:
   a movable linkage assembly connected to a landing assembly of an aircraft;
   an indicator associated with the linkage assembly;
   at least one biasing mechanism operably coupled to the indicator such that a biasing force of the biasing mechanism is applied to the indicator; and
   a position sensing mechanism coupled to the indicator to determine a position of the indicator.

2. The weight-on-wheel sensing system of claim 1, wherein during normal operation, movement of the linkage assembly causes the indicator to translate about an axis between a first position and a second position.

3. The weight-on-wheel sensing system of claim 1, wherein during normal operation, the linkage assembly overcomes the biasing force of the at least one biasing mechanism.

4. The weight-on-wheel sensing system of claim 1, wherein during a failure of the weight-on-wheel sensing system, the biasing force of the at least one biasing mechanism causes the indicator to transition to a failure position, the failure position being outside of a range of motion between the first position and the second position.

5. The weight-on-wheel sensing system of claim 1, wherein the position sensing mechanism is operably coupled to a control system to communicate a position of the indicator to the control system.

6. The weight-on-wheel sensing system of claim 5, wherein the control system is configured to determine an operational status of the weight-on-wheel sensing system in response to the position of the indicator.

7. The weight-on-wheel sensing system of claim 1, wherein the linkage assembly includes a push rod.

8. The weight-on-wheel sensing system of claim 7, wherein the indicator is a free end of the push rod and the position sensing mechanism is one of a linear variable differential transformer, potentiometer, and position sensor, coupled to the free end of the push rod.

9. The weight-on-wheel sensing system of claim 1, further comprising:
 a bracket;
 wherein the indicator includes a lever mounted to the bracket via a shaft, the lever being rotatable about an axis of rotation.

10. The weight-on-wheel sensing system of claim 9, wherein the at least one biasing mechanism is connected to a first end of the lever.

11. The weight-on-wheel sensing system of claim 10, wherein the linkage assembly is connected to a second end of the lever, wherein the linkage assembly is configured to translate along an axis.

12. An aircraft comprising:
 an airframe;
 a landing gear operably coupled to the airframe;
 a weight-on-wheels sensing system associated with the landing gear, the weight-on-wheels sensing system including:
  an indicator movable in response to a position of the at least one landing gear, wherein during normal operation, the indicator is movable between a first position and a second position;
  a position sensing mechanism coupled to the indicator; and
  a biasing mechanism operably coupled to the indicator, wherein if the weight-on-wheels sensing system fails, the biasing mechanism automatically biases the indicator to a failure position, the failure position being outside of a range of motion of the indicator during normal operation.

13. The aircraft of claim 12, wherein during normal operation of the weight-on-wheel sensing system, the indicator is movable relative to an axis between a first position and a second position.

14. The aircraft of claim 12, further comprising a flight control system, the position sensing mechanism being arranged in communication with the flight control system to communicate a position of at least one of the indicator and the landing gear.

15. The aircraft of claim 12, wherein the position sensing mechanism is operably coupled to a control system to communicate a position of the indicator to the control system.

16. The aircraft of claim 12, further comprising:
 a linkage assembly associated with the indicator.

17. The aircraft of claim 16, wherein during normal operation of the weight-on-wheel sensing system, movement of the at least one landing gear overcomes a biasing force of the at least one biasing mechanism acting on the indicator.

18. The aircraft of claim 12, wherein the weight-on-wheels sensing system is mounted to at least one of the airframe and the landing gear.

19. The aircraft of claim 12, wherein the weight-on-wheels sensing system is mounted within a stub wing of the aircraft.

* * * * *